United States Patent [19]
Galloway et al.

[11] Patent Number: 5,784,578
[45] Date of Patent: Jul. 21, 1998

[54] METHOD AND SYSTEM FOR ENHANCING THE EFFICIENCY OF DATA COMMUNICATION BETWEEN A TERMINAL DEVICE AND A HOST COMPUTER HAVING AN OPTIMIZER

[75] Inventors: David William Galloway, Raleigh; James Merwin Mathewson, II, Chapel Hill, both of N.C.

[73] Assignee: International Business Machines Corporation, Armonk, N.Y.

[21] Appl. No.: 588,664

[22] Filed: Jan. 17, 1996

[51] Int. Cl.$^6$ .............. G06F 13/00; G06F 13/14
[52] U.S. Cl. .............. 395/285; 395/200.6; 395/200.63; 395/200.76
[58] Field of Search .............. 395/285, 200.6, 395/200.61, 200.62, 200.76, 200.63; 364/514

[56] References Cited

U.S. PATENT DOCUMENTS

| | | | |
|---|---|---|---|
| 500,137 | 4/1893 | Ernst | 395/200.49 |
| 5,113,354 | 5/1992 | Harper et al. | 395/200.76 |

Primary Examiner—Jack B. Harvey
Assistant Examiner—Ario Etienne
Attorney, Agent, or Firm—Stephen T. Keohane; Gerald R. Woods

[57] ABSTRACT

In a data processing system having a host computer running an application that communicates with a terminal device through an optimizer, a terminal data stream is created in response to an operator input sequence at the terminal device. Thereafter, a selected combination of an operator input sequence and a selected terminal data stream, is identified at the terminal wherein such a selected combination will result in an incorrect representation in an optimizer presentation space memory of data stored in a terminal presentation space memory. In response to identifying the selected combination described above, terminal status data is added to the selected terminal data stream to create a modified terminal data stream, wherein the modified data stream includes information necessary for the optimizer to correctly represent in the optimizer presentation space memory data that is stored in the terminal presentation space memory. Next, the modified terminal data stream is sent to the optimizer, and the optimizer records data in the optimizer presentation space memory that represents data stored in the terminal presentation space memory. Next, the terminal status data is removed from the modified terminal data stream to recreate the selected terminal data stream in the optimizer. Finally, the optimizer sends the selected terminal data stream to the application running in the host computer, wherein the optimizer correctly maintains a record of data stored in the terminal presentation space memory.

44 Claims, 4 Drawing Sheets

METHOD AND SYSTEM FOR ENHANCING THE EFFICIENCY OF DATA COMMUNICATION BETWEEN A TERMINAL DEVICE AND A HOST COMPUTER HAVING AN OPTIMIZER

BACKGROUND OF THE INVENTION

1. Technical Field

The present invention relates in general to an improved data processing system, and in particular to an improved method and system for enhancing the efficiency of data transmission between a host computer having an optimizer and a terminal device. Still more particularly, the present invention relates to an improved method and system for efficiently transmitting data between an optimizer and a terminal device.

2. Description of the Related Art

It is well known in the prior art to connect a host computer to a terminal device via a communications link. Such a terminal device may include a display screen and operator input devices, such as a keyboard or a selector pen, or the like. The display screen may be used to display data received from an application program running in the host computer and display data entered by the terminal operator. The communications link is used to transmit data both from the host computer to the terminal device and from the terminal device to the host computer.

One of the critical resources used in the transmission of data between such a host computer and the operator's terminal device is the capacity of the transmission media used by the communications link. In many data processing systems, the transmission media used is the public telephone network because it is easily accessed from almost any remote location. Examples of such remotely located computer operators include a travel agent having a terminal connected to a host computer that is running an application to make airline and hotel reservations. Another example is an insurance adjuster or salesperson connected to a centrally located host computer running an application that processes data regarding customers and claims. As application programs become more powerful and complex, and as terminal operators come to expect computers to respond quickly, increasing the efficiency of data communication between host computer and terminal device becomes more important. One way to decrease the response time of the host computer to an operator input is to reduce the amount of data transmitted between the host computer and the terminal device.

In the International Business Machines ("IBM") 3270 data stream architecture—which is the protocol, or set of rules, used to transmit data between the host computer and the terminal device, a number of different schemes have been developed to reduce the amount of data transmitted between a host computer and a terminal device. For example, when performing an inbound READ MODIFY operation, "NULLS" in the inbound data stream are suppressed. In another scheme, Format Storage enabled applications are able to transmit data once and the data can be used in the host many times thereafter. Other methods for reducing the amount of transmitted data use data compression algorithms.

One of the more effective methods for reducing the amount of data transmitted has to been to use a data stream optimizer. Such an optimizer optimizes an outgoing data stream sent from an application running in the host computer by (1) creating an updated-state map representing the state of the peripheral or terminal device buffer expected to exist after processing by the terminal device of an inbound data stream, (2) performing an exclusive-or ("XOR") operation using the updated-state map and a present-state map representing the existing state of the terminal device buffer, and (3) constructing and transmitting a substitute outbound data stream which represents only changes to the terminal device buffer. Thus, an outbound data stream from the application in the host computer will contain only the data necessary to modify certain terminal device attributes, such as screen characters, rather than containing enough data to repaint or reconfigure the entire terminal device.

For more information regarding the operation of optimizers, see U.S. Pat. No. 4,750,137 to Harper, et al.; U.S. Pat. No. 4,837,679, to Wiles, Jr., et al.; U.S. Pat. No. 4,937,739 to Ernst, et al.; U.S. Pat. No. 5,005,137 to Ernst; U.S. Pat. No. 5,113,354 to Harper, et al.; U.S. Pat. No. 5,046,025 to Harper, et al.; and U.S. Pat. No. 5,122,949 to Harper, et al. These optimizers are typically used to reduce the amount of data transmitted to a terminal device that uses a 3270 architecture. Such an optimizer typically runs in the host computer with its function performed on the data stream between the application program and a communication program, wherein the communication program is responsible for communicating with multiple 3270 terminal devices. While the examples described herein refer to terminal devices utilizing a 3270 architecture, other terminal architectures may have problems similar to those solved by the present invention.

In the 3270 architecture, a SHORT READ operation transmits only an AID (Attention Identifier) code in the inbound data stream to the application program. Such a SHORT READ operation is performed in response to a depression of program attention (PA) keys PA1, PA2 (CNCL), and PA3 and in response to CLEAR operation performed by the terminal operator. Because the terminal operator may have entered an input sequence (e.g., keystrokes) that modifies data in a terminal presentation space memory before the SHORT READ operation is performed, the optimizer, in some instances, is unable to maintain a representation of data stored in the terminal presentation space memory. This "synchronization" problem between data in terminal presentation space memory and data stored in the optimizer presentation-memory is caused by the fact that only the AID is sent in the inbound data stream from the terminal, and any changes in terminal presentation space are not reflected in the inbound data stream that results when an operator depresses the PA1, PA2 or PA3 keys.

In the prior art, an optimizer that loses synchronization with the terminal presentation space memory would perform a READ BUFFER operation to resynchronize the optimizer presentation space memory with the terminal presentation memory. Such a READ BUFFER operation causes the terminal device to transmit all data in the terminal presentation space memory to the optimizer so that the optimizer may reinitialize or resynchronize optimizer presentation space memory. Because this loss of synchronization between presentation space memories results in a READ BUFFER operation that transmits a large amount of data, the purpose of the optimizer—which is to reduce the volume of data transmitted between the terminal device and the host computer—is frustrated, and the efficiencies in communication gained by using the optimizer are significantly diminished.

Another situation which disturbs the synchronization of presentation space memory between the terminal device and the optimizer occurs when an operator performs an ERASE INPUT function prior to an AID operation. When the operator performs an ERASE INPUT function, all unprotected fields are cleared (i.e., set to 'OO'X, the NULL character). In addition to clearing unprotected fields, the modified data tag (MDT) bit is set to 'O'B which indicates that the unprotected fields have not been modified when, in fact, they have just been cleared. This means that the fields that were just set to NULLs by the ERASE INPUT function would not be transmitted to the host application unless the operator modifies the field prior to the AID operation. Therefore, if the operator performs an ERASE INPUT function prior to an AID operation, the optimizer does not receive enough data in the inbound data stream to update the optimizer presentation space memory in order to keep it in synchronization with the terminal presentation space memory.

In a situation similar to the ERASE INPUT situation described above, an operator uses a selector pen or a cursor select to select a field having a designator character which is either a "?" or a ">". These designator characters indicate that the selector pen field has been selected. When the designator character changes from a "?" to a ">", or vice versa, the MDT bit in the field attribute is toggled. If the MDT bit is equal to one, it indicates that a field has been modified. If the MDT bit is set to zero, it indicates that the field has not been modified. When the selector pen or cursor select is used to select a selector pen detectable field having a designator character of "?", the designator character is changed to ">" and the MDT bit is set to one. Then, when the designator character is ">", a subsequent use of the selector pen or cursor select will cause the designator character to change to "?" and the MDT bit to be set once again to zero, regardless of whether or not the selected field was modified by the operator. Thus, the problem occurs when a modification to the field was made and the MDT bit is set to zero, which indicates that the field was not modified. An indication that the field was not modified means that the modified data will not be sent to the host application in a subsequent inbound data stream. Because the terminal presentation space memory was modified and the inbound data stream does not reflect this modification, synchronization between the optimizer presentation space memory and the terminal presentation space memory will be lost and the efficiencies in communication gained by using the optimizer will be diminished.

In the 3270 data stream architecture, NULLs are suppressed when sending an inbound data stream to the host in order to decrease the amount of data that is transmitted. This becomes a problem when, for example, the operator enters a first and last name in a field and uses a cursor key to move the cursor from the last character in the first name to the first character of the last name. Such a cursor movement leaves a NULL character between the first and last names instead of a "SPACE" character. When this newly entered data is sent to the application, the NULL character between the first and last names is not transmitted. This omission of the NULL character causes an incorrect representation in the optimizer representation space memory of data stored in the terminal presentation space memory. Because the optimizer and terminal presentation memories are no longer synchronized, additional data will be transferred from the terminal device to the optimizer to reinitialize the optimizer presentation space memory as described above. This additional data transfer becomes a problem when the goal of the optimizer is to reduce the amount of data transferred between the terminal device and the host computer.

SUMMARY OF THE INVENTION

It is therefore one object of the present invention to provide an improved data processing system.

It is another object of the present invention to provide an improved method and system for enhancing the efficiency of data transmission between a host computer having an optimizer and a terminal device.

It is yet another object of the present invention to provide an improved method and system for efficiently transmitting data between an optimizer and a terminal device.

The foregoing objects are achieved as is now described. In a data processing system having a host computer running an application that communicates with a terminal device through an optimizer, a terminal data stream is created in response to an operator input sequence at the terminal device. Thereafter, a selected combination of (1) an operator input sequence, and (2) a selected terminal data stream, is identified at the terminal wherein such a selected combination will result in an incorrect representation in an optimizer presentation space memory of data stored in a terminal presentation space memory. In response to identifying the selected combination described above, terminal status data is added to the selected terminal data stream to create a modified terminal data stream, wherein the modified data stream includes information necessary for the optimizer to correctly represent in the optimizer presentation space memory data that is stored in the terminal presentation space memory. Next, the modified terminal data stream is sent to the optimizer, and the optimizer records data in the optimizer presentation space memory that represents data stored in the terminal presentation space memory. Next, the terminal status data is removed from the modified terminal data stream to recreate the selected terminal data stream in the optimizer. Finally, the optimizer sends the selected terminal data stream to the application running in the host computer, wherein the optimizer correctly maintains a record of data stored in the terminal presentation space memory.

BRIEF DESCRIPTION OF THE DRAWINGS

The novel features believed characteristic of the invention are set forth in the appended claims. The invention itself, however, as well as a preferred mode of use, further objects and advantages thereof, will be best be understood by reference to the following detailed description of an illustrative embodiment when read in conjunction with the accompanying drawings, wherein:

DETAILED DESCRIPTION OF THE PREFERRED EMBODIMENT

Figure 1:
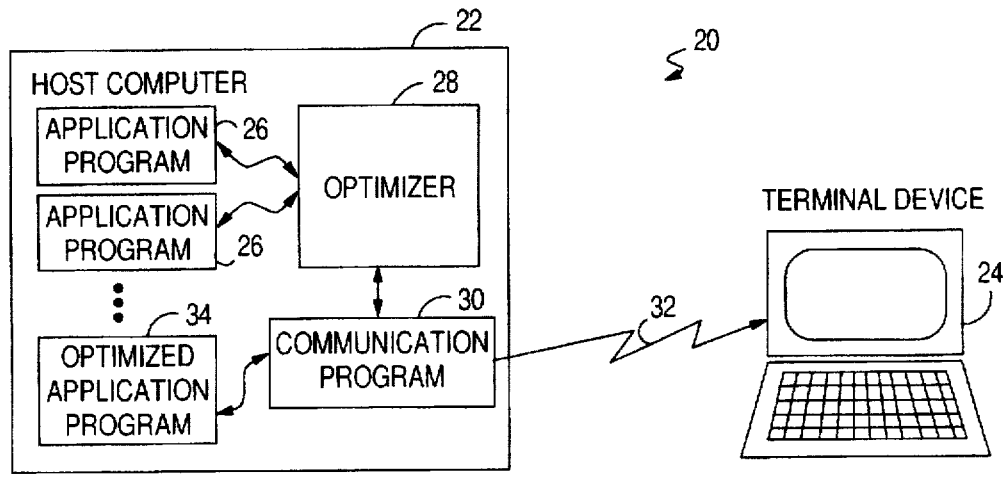
FIG. 1 depicts a data processing system having a host computer, an optimizer, and a terminal device, in accordance with the method and system of the present invention.

With reference now to the figures, and in particular to FIG. 1, there is depicted a data processing system 20, which includes host computer 22 and terminal device 24. Host computer 22 may be implemented by the computer sold under the trademark "IBM System/370" by International Business Machines Corporation, of Armonk, N.Y. Terminal device 24 may be implemented by the terminal device sold under the trademark "IBM 3270 Information Display System" by International Business Machines Corporation, of Armonk, N.Y.

As illustrated in FIG. 1, host computer 22 is capable of running several programs simultaneously, such as application programs 26, optimizer 28, and communication program 30. Examples of application programs 26 include airline reservation applications or large insurance company database applications. Optimizer 28 intercepts outbound data streams from applications 26 and modifies such data streams so that they contain only data that is necessary to properly operate terminal device 24.

Communication program 30 formats data streams and selects a proper communications link, such as communications link 32, for sending data streams to selected terminal devices, such as terminal device 24. Communication program 30 communicates with terminal device 24 via communications link 32 utilizing a particular telecommunications protocol. An example of such a protocol is the IBM 3270 protocol. Using this IBM 3270 protocol, terminal device 24 receives outbound data streams for controlling terminal device 24 and providing data for a screen display viewed by the operator of terminal device 24. In response to an operator input sequence (e.g., one or more keystrokes or other operator actions for entering operator data or commands), terminal device 24 generates an inbound data stream in accordance with the 3270 protocol. Such an inbound data stream is sent to an application program 26 via communication program 30 and optimizer 28.

Figure 2:
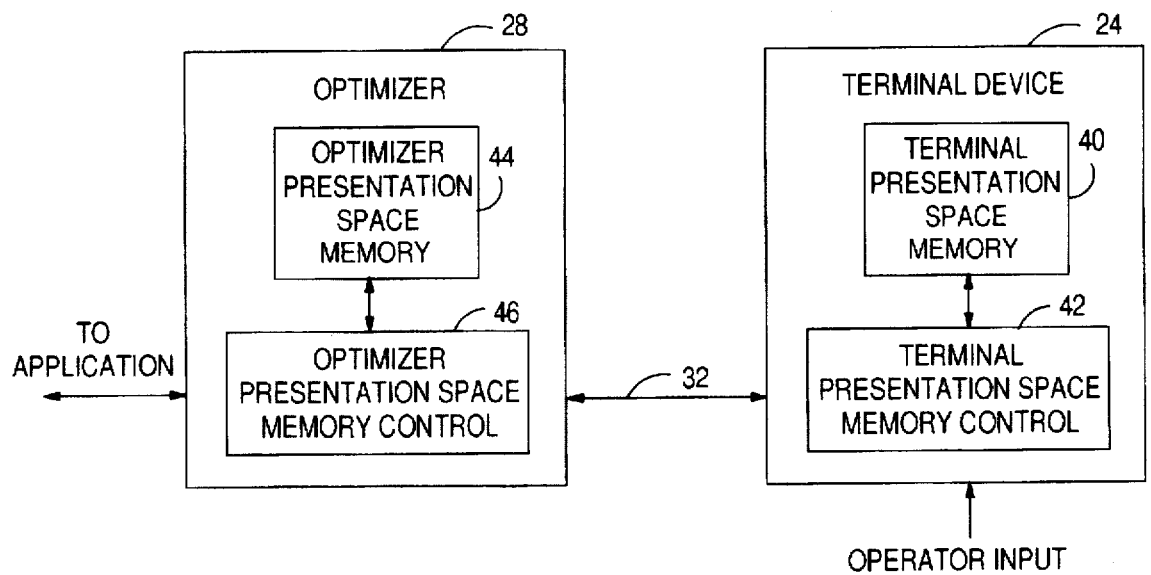
FIG. 2 is a high-level block diagram which further illustrates components within the terminal device and the optimizer, in accordance with the method and system of the present invention.

With reference now to FIG. 2, there is depicted a high-level block diagram which further illustrates components within the terminal device and the optimizer, in accordance with the method and system of the present invention. As illustrated, terminal device 24 includes a terminal presentation space memory 40 which is used to store data that causes particular characters to be displayed on the screen of terminal device 24 or that causes terminal device 24 to operate in a selected mode of operation. Such data is stored in terminal presentation space memory 40 by terminal presentation space memory control 42, which receives operator input from a keyboard or a light pen, or other similar input devices connected to terminal device 24. Data in terminal presentation space memory 40 may also be received from application program 26 via communications link 32. Terminal presentation space memory control 42 may be implemented with combinatorial logic or with any one of several known combinations of hardware and software.

Optimizer 28 includes optimizer presentation space memory 44 which receives and stores data from optimizer presentation space memory control 46. Optimizer presentation space memory control 46 may be implemented with combinatorial logic or any one of several known combinations of hardware and software. In order to perform the optimizing function, optimizer presentation space memory 44 must contain a copy, or alternatively, a representation of data stored in terminal presentation space memory 40. When the data stored in terminal presentation space memory 40 may be reproduced with data stored in optimizer presentation space memory 44, it may be said that optimizer presentation space memory 44 is in "synchronization" with terminal presentation space memory 40 or that optimizer presentation space memory 44 "mirrors" terminal presentation space memory 40.

Optimizer presentation space memory 44 must remain in synchronization with terminal presentation space memory 40 so that optimizer 28 may remove data from an outbound data stream that is superfluous or does not add to the proper presentation of data at terminal device 24. For example, if a word appears on the screen of terminal device 24, optimizer 28 must know that the word is displayed on the screen of terminal device 24 in order to intercept the outgoing data stream and to remove data from that outgoing data stream that would cause the terminal to display the word that it is already displaying. Thus, if optimizer presentation space memory 44 does not mirror data contained in terminal presentation space memory 40, the display of terminal device 24 may become garbled or unintelligible.

Figure 3:
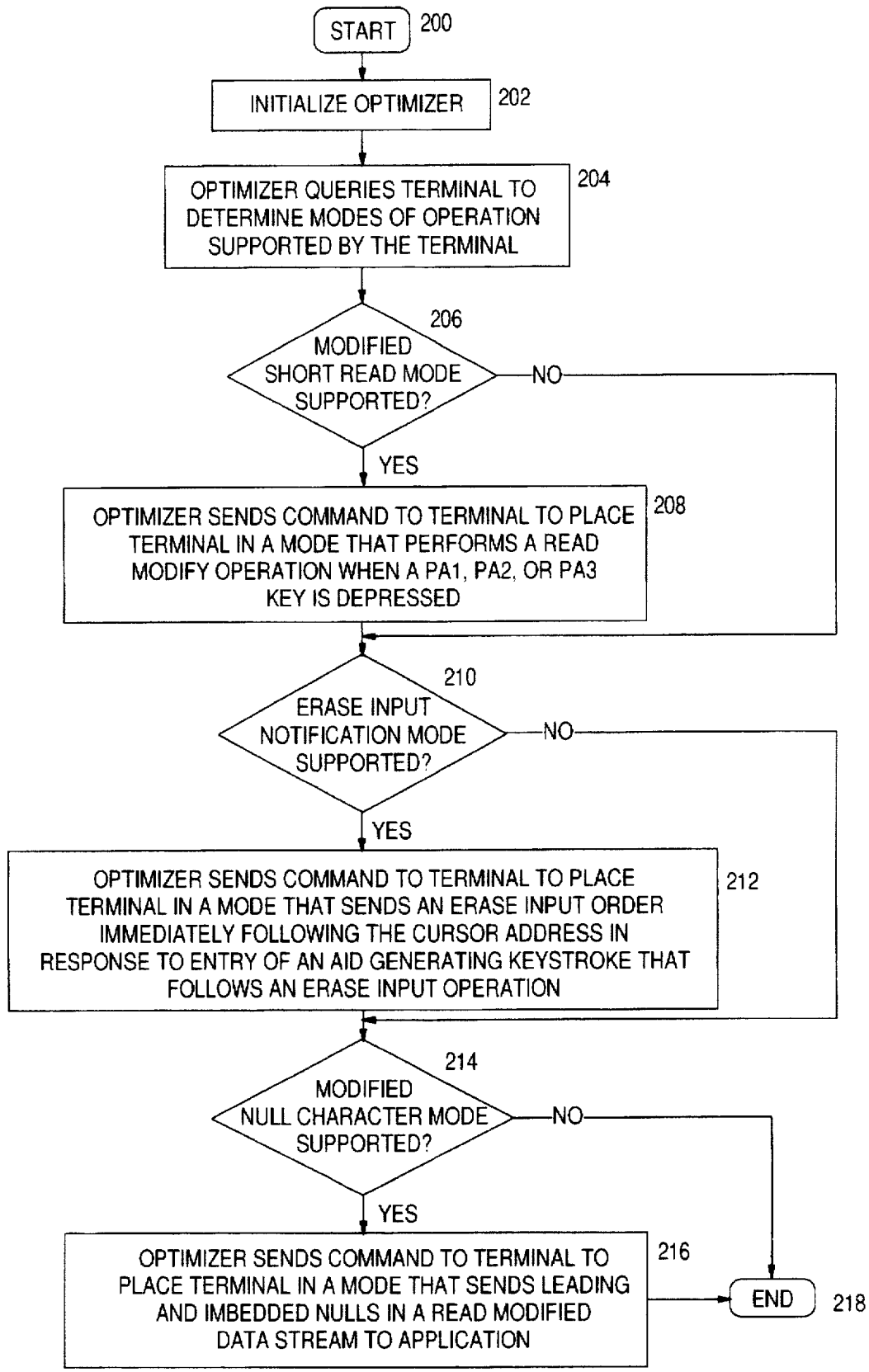
FIG. 3 depicts a high-level flow chart of the process of initializing the optimizer and the terminal device, in accordance with the method and system of the present invention.

Referring now to FIG. 3, there is depicted a high-level flowchart that illustrates the process of initializing an optimizer and a terminal device in accordance with the method and system of the present invention. As illustrated, the process begins at block 200 and thereafter passes to block 202 wherein the optimizer performs an initialization process in accordance with optimizers known in the prior art. Such an initialization process may include initializing optimizer presentation space memory 44, initiating communication with application programs 26 and communication program 30, and the like.

Next, the optimizer queries the connected terminal device to determine modes of operation supported by the terminal device, as illustrated at block 204. The process then determines whether or not the modified SHORT READ mode is supported, as depicted at block 206. If the modified SHORT READ mode is supported, the optimizer sends a command to the connected terminal device to place the terminal device in a mode that performs a READ MODIFY operation when a PA1, PA2, or PA3 key is depressed, as illustrated at block 208. The operation of such a modified SHORT READ mode is described in greater detail below with reference to FIGS. 4 and 5.

Next, the process determines whether or not the ERASE INPUT notification mode is supported by the terminal device, as depicted at block 210. If the ERASE INPUT notification mode is supported, the optimizer sends a command to the terminal device to place the terminal device in a mode that sends an ERASE INPUT order in the outbound data stream immediately following the CURSOR ADDRESS in response to the entry of an AID generating keystroke that follows an ERASE INPUT operation, as illustrated at block 212. Detailed operation of the ERASE INPUT notification mode is described below with reference to FIGS. 4 and 5.

The process then determines whether or not the modified NULL character mode is supported by the terminal device, as depicted at block 214. If the modified NULL character mode is supported, the optimizer sends a command to the terminal device to place the terminal device in a mode that sends leading and imbedded NULLs in a READ MODIFY data stream which is sent to the application program, as illustrated at block 216. Detailed operation of the modified NULL character mode is described below with reference to FIGS. 4 and 5.

Thereafter, the process of initializing optimizer 28 and terminal device 24 (see FIG. 2) ends, as depicted at block 218.

Figure 4:
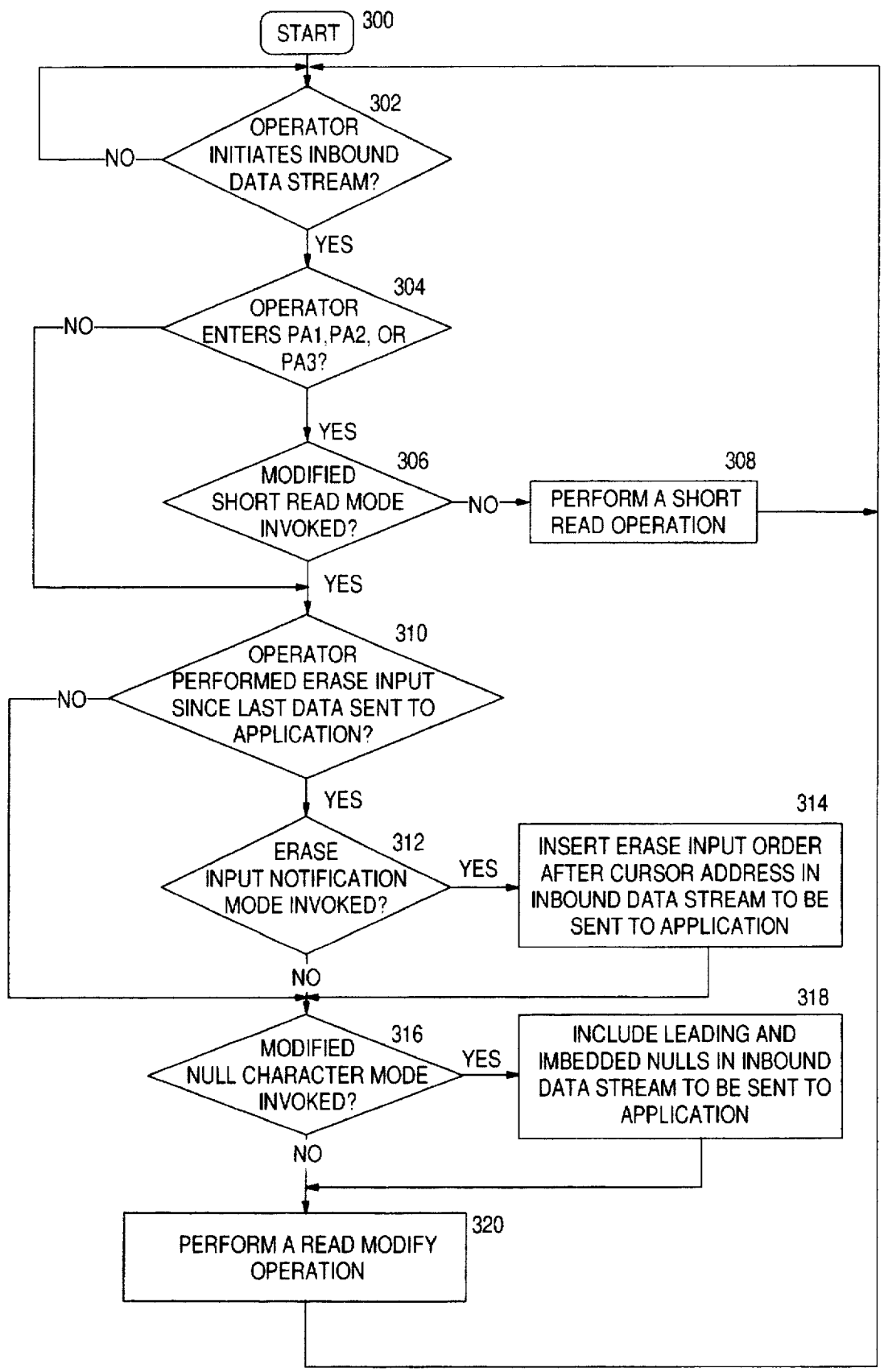
FIG. 4 depicts a high-level flow chart that illustrates the process of generating an inbound data stream from a terminal device, in accordance with the method and system of the present invention.

With reference now to FIG. 4, there is depicted a high-level flowchart that illustrates the process performed in the terminal device to enhance the efficiency of data transmission between the optimizer and the terminal device in accordance with the method and system of the present invention. As illustrated, the process begins at block 300 and thereafter passes to block 302 wherein the terminal device determines whether or not the terminal operator has initiated an inbound data stream. If the operator has initiated an inbound data stream, the terminal device continues by determining whether or not the operator has entered or depressed a PA1, PA2, or PA3 key, as illustrated at block 304.

If the operator has entered a PA1, PA2, or PA3 key, the terminal device determines whether or not the modified SHORT READ mode has been invoked in the terminal device, as depicted at block 306. If the modified SHORT READ has not been invoked, the process performs a SHORT READ operation, as illustrated at block 308. Such a SHORT READ operation sends only an AID code from terminal device 24 through optimizer 28 to application program 26.

If, at block 304, the operator has not entered a PA1, PA2, or PA3 key, or if at block 306, the modified SHORT READ mode has been invoked, the process proceeds at block 310 wherein the terminal device determines whether or not the terminal operator performed an ERASE INPUT since the last inbound data stream was sent to the application program. If the operator has not performed an ERASE INPUT since the last data was sent to the application, the process continues at block 316. However, if the operator has depressed the ERASE INPUT key since the last data stream was sent, the terminal device determines whether or not the ERASE INPUT notification mode has been invoked, as depicted at block 312.

If the ERASE INPUT notification mode has been invoked, the process inserts an ERASE INPUT order after the CURSOR ADDRESS in the inbound data stream to be sent to the application program, as illustrated at block 314. This process of inserting the ERASE INPUT order adds terminal status data to a terminal data stream (i.e., inbound data stream) in the terminal device to create a modified terminal data stream that includes information necessary for optimizer 28 to correctly represent or store information in the optimizer presentation space memory 44 that mirrors data stored in terminal presentation space memory 40.

If the ERASE INPUT notification mode has not been invoked, or if the ERASE INPUT order has been inserted in the inbound data stream as shown at block 314, the process in the terminal device continues by determining whether or not the modified NULL character mode has been invoked, as depicted at block 316. If the modified NULL character mode has been invoked, the terminal device includes leading and imbedded NULLs in the inbound data stream which will be sent to the application program, as illustrated at block 318. By including leading and imbedded NULLs in the inbound data stream, the optimizer is able to avoid storing a concatenation of two words in the optimizer presentation space memory 44 wherein such words are separated by a NULL character in the terminal presentation space memory 40.

Once the leading and imbedded NULLs have been included in the inbound data stream, or once it has been determined that the modified NULL character mode has not been invoked, the terminal device performs a READ MODIFY operation, as depicted at block 320. Thus, the modified terminal data stream that was modified according to the features of the present invention is sent to the optimizer, as shown at block 320. Such a modified terminal data stream includes terminal status data, or additional information, that is needed to maintain synchronization between optimizer presentation space memory 44 and terminal presentation space memory 40. After performing the READ MODIFY operation, the process in the terminal device returns to block 302 and awaits the next terminal operator input that initiates an inbound data stream.

Those persons skilled in the art should recognize that several combinations of operator input sequences and terminal data streams have been described in FIG. 4, and that each of these combinations will result in an incorrect representation in the optimizer presentation space memory 44 of data stored in the terminal presentation space memory 40. FIG. 4 describes the addition of terminal status data to selected terminal data streams that follow selected operator input sequences in order to prevent such an incorrect representation in the optimizer presentation space memory.

Figure 5:
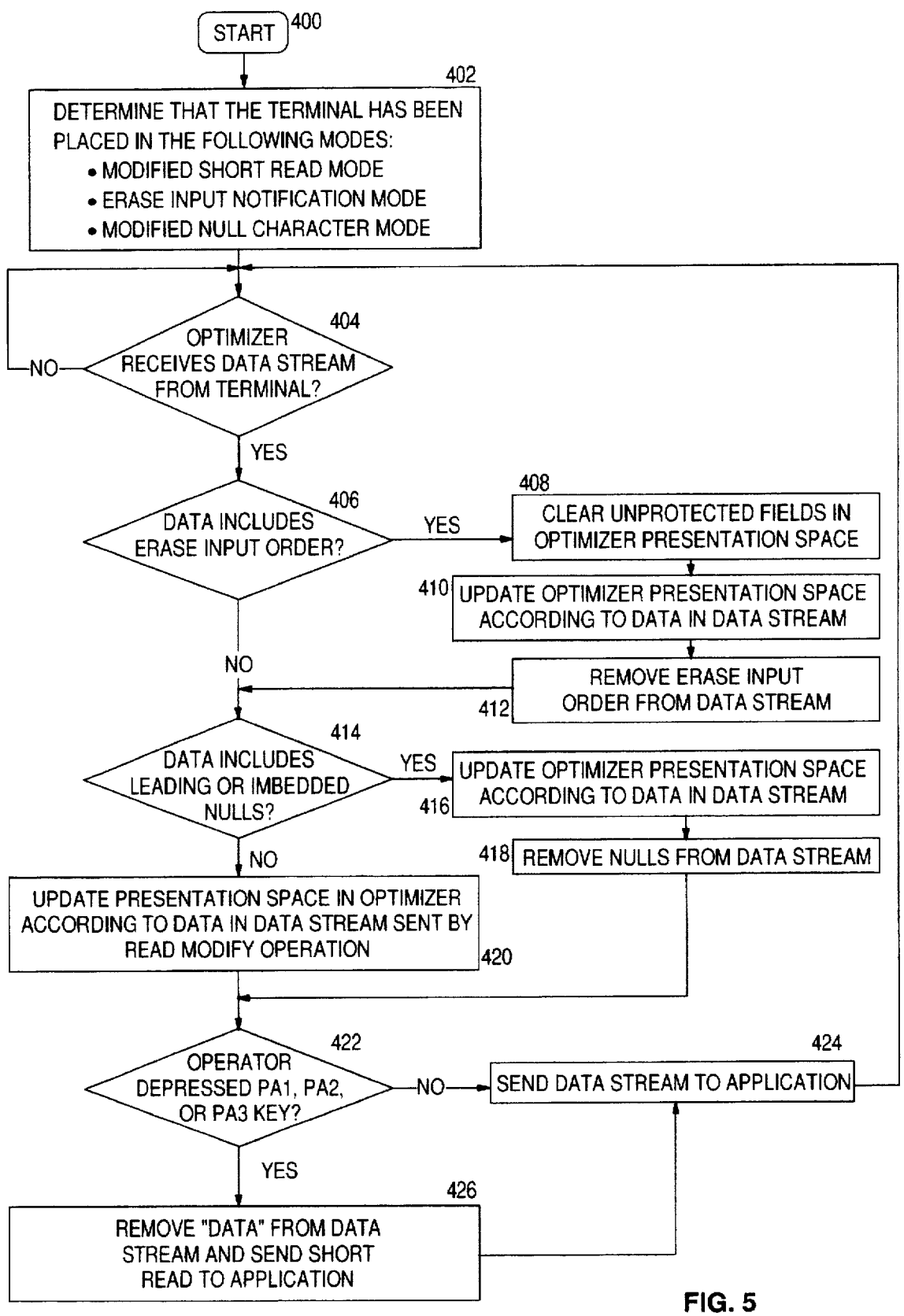
FIG. 5 depicts a high-level flow chart that illustrates the process of sending a data stream to an application and recording data in the optimizer presentation space memory that represents data stored in a terminal presentation space memory, in accordance with the method and system of the present invention.

With reference now to FIG. 5, there is depicted a high-level flowchart that illustrates the processing of data streams in an optimizer in accordance with the method and system of the present invention. As illustrated, the process begins at block 400 and thereafter passes to block 402 wherein the optimizer determines that the terminal device has been placed in the following modes according to the present invention: (1) the modified SHORT READ mode, (2) the ERASE INPUT notification mode; and (3) the modified NULL character mode. For the purpose of illustration, it is assumed that all three new modes have been invoked, although any combination of these modes may be invoked, or not invoked, in any particular application.

Next, the optimizer determines whether or not an inbound data stream has been received from the terminal device, as illustrated at block 404. If an inbound data stream has been received, the process in the optimizer continues by determining whether or not the inbound data stream includes an ERASE INPUT order, as depicted at block 406. If the inbound data stream includes an ERASE INPUT order and the ERASE INPUT notification mode has been invoked as determined at block 402, the optimizer clears, or places NULLs in, the unprotected fields in the optimizer presentation space memory 44, as illustrated at block 408. The unprotected fields in the optimizer presentation space memory 44 are cleared because that is what was done to the unprotected fields in the terminal presentation space memory 40 when the terminal operator input or depressed the ERASE INPUT key at terminal device 24.

Next, the optimizer presentation space memory 44 is updated according to the remaining data in the inbound data stream, as depicted at block 410. Thereafter, the ERASE INPUT order is removed from the inbound data stream, as illustrated at block 412.

If the inbound data stream does not include an ERASE INPUT order, or if the inbound data stream has been processed as indicated in blocks 408 through 412, the optimizer next determines whether or not the inbound data stream includes leading or imbedded NULL characters, as depicted at block 414. If the inbound data stream includes leading or imbedded NULLs, and the modified NULL character mode has been invoked as determined at block 402, the optimizer updates the optimizer presentation space memory according to data in the inbound data stream, as illustrated at block 416. Thereafter, the optimizer removes the NULL characters from the inbound data stream, as depicted at block 418, and sends the inbound data stream to the application program, as illustrated at block 420. Notice, at block 420, the inbound data stream sent to the application program may have had terminal status data removed from the modified terminal data stream received from the terminal device, wherein such removed terminal status data includes an ERASE INPUT order or NULL characters or other such characters that are necessary to maintain syncronization between terminal presentation space memory 40 and optimizer presentation space memory 44.

If, at block 414, the data does not include leading or imbedded NULL characters, the optimizer updates the presentation space memory in the optimizer according to the data in the inbound data stream sent by the READ MODIFY operation at the terminal device, as illustrated at block 420. Thereafter, the optimizer determines whether or not the operator depressed a PA1, PA2, or PA3 key at the terminal device, as depicted at block 422. If the operator did not depress a PA1, PA2, or PA3 key, the process sends the inbound data stream to the application program as illustrated at block 424. However, if the operator had depressed a PA1, PA2, or PA3 key to generate the inbound data stream, the optimizer removes the "data" following the AID code in the inbound data stream, so that it appears from the view point of the application program that a SHORT READ operation has been performed, as depicted at block 426. Thereafter, the inbound data stream, which at this point consists of only an AID code, is sent to the application program, as illustrated at block 424, and the optimizer waits to receive the next data stream from the terminal device, as depicted at block 404.

Those persons skilled in the art should recognize that FIG. 5 describes the process of removing terminal status data from a modified terminal data stream received from a terminal device in order to recreate a terminal data stream that would have destroyed the synchronization between optimizer presentation space memory 44 and terminal presentation space memory 40, which in turn would have decreased the efficiency gained by optimizer 28.

In FIG. 1, optimizer 28 has been shown as a separate program that interfaces with application programs 26 and communication program 30. In many data processing systems, it is desireable that optimizer 28 be a separate program in order to avoid the difficult task of modifying a large or complex application program 26 to perform the communication functions of optimizer 28. However, as new applications are written, the functions of optimizer 28 may be incorporated into such new programs, such as optimize application program 34. Therefore, a data processing system having an optimized application program 34 is to be considered within the scope of the invention, as determined by the appended claims. Those persons skilled in the art should recognize that the functions performed by optimizer 28 in accordance with the present invention may be subsumed by optimized application program 34.

The following tables describe particular bytes of data that are transmitted between optimizer 28 and terminal device 24 to implement the method and system of the present invention. This example of the control information necessary to implement the present invention is one of several possible ways to transfer control information to implement the present invention. Furthermore, the examples shown below adhere to IBM 3270 architecture, and therefore minimizes the impact of implementing the present invention on any other software or systems in data processing system 20.

Table 1 below illustrates the data that may be used to indicate that the terminal device supports the modified SHORT READ mode of the present invention as described above. As shown in Table 1, a SELF DEFINING PARAMETER is used in the Reply Mode Query Reply.

TABLE 1

| BYTE | CONTENT DESCRIPTION | Comments |
|---|---|---|
| 0 | Structured Field Length | X'02' |
| 1 | SDP Type | X'01' - SHORT READ Modification |

Table 2 below shows the data the optimizer 28 sends to terminal device 24 to indicate that terminal device 24 should operate in the modified SHORT READ mode. A SELF DEFINING PARAMETER is used in the Set Reply Mode.

TABLE 2

| BYTE | CONTENT DESCRIPTION | Comments |
|---|---|---|
| 0 | Structured Field Length | X'03' |
| 1 | SDP Type | X'01' - SHORT READ Modification |
| 2 | SDP Parameter | Bits 0-3 Reserved<br>Bits 4 - Perform READ MODIFY Operation for Selector Pen Attention<br>Bits 5 - Perform READ MODIFY Operation for PA1<br>Bits 6 - Perform READ MODIFY Operation for PA2<br>Bits 7 - Perform READ MODIFY Operation for PA3 |

As per other Reply Mode settings, these settings will be reset by:

1) Any keyboard operation that causes a clear operation;

2) WCC Reset bit in EW/EWA;

3) BIND;

4) Erase/Reset SF; and

5) Subsequent Set Reply Mode.

Table 3 below shows the data sent from terminal device 24 to optimizer 28 to indicate the ability to operate in the ERASE INPUT notification mode according to the present invention. A SELF DEFINING PARAMETER in the Reply Mode Query Reply is used to transfer this data.

TABLE 3

| BYTE | CONTENT DESCRIPTION | Comments |
|---|---|---|
| 0 | Structured Field Length | X'02' |
| 1 | SDP Type | X'02' - ERASE INPUT ORDER support |

Table 4 below shows the data transmitted from optimizer 28 to terminal device 24 in order to put terminal device 24 in the ERASE INPUT notification mode according to the present invention. A SELF DEFINING PARAMETER in the Set Reply Mode is used to transfer this control data.

TABLE 4

| BYTE | CONTENT DESCRIPTION | Comments |
|---|---|---|
| 0 | Structured Field Length | X'02' |
| 1 | SDP Type | X'02' - Generate ERASE INPUT Order |

As per other Reply Mode settings, this setting will be reset by:
1) Any Keyboard Operation that causes a Clear Operation;
2) WCC Reset bit in EW/EWA;
3) BIND;
4) Erase/Reset SF; and
5) Subsequent Set Reply Mode.

Table 5 below shows the control data sent from terminal device 24 to optimizer 28 to indicate the ability to operate in the modified NULL character mode according to the present invention. A SELF DEFINING PARAMETER is used in the Reply Mode Query Reply.

TABLE 5

| BYTE | CONTENT DESCRIPTION | Comments |
|---|---|---|
| 0 | Structured Field Length | X'03' |
| 1 | SDP Type | X'03' - NULLs transmitted INBOUND |
| 2 | SDP Parameter | Bits 0–5 Reserved<br>Bits 6 - Imbedded NULLs<br>Bits 7 - Leading NULLs |

Table 6 below shows control data sent from optimizer 28 to terminal device 24 to put terminal device 24 in the modified NULL character mode according to the present invention. A SELF DEFINING PARAMETER is used in the Set Reply Mode to transfer this control data.

TABLE 6

| BYTE | CONTENT DESCRIPTION | Comments |
|---|---|---|
| 0 | Structured Field Length | X'03' |
| 1 | SDP Type | X'03'- NULLs handling in a READ MODIFY operation |
| 2 | SDP Parameter | Bits 0–5 Reserved<br>Bits 6 - Transmit Imbedded NULLs<br>Bits 7 - Transmit Leading NULLs |

As per other Reply Mode settings, this setting will be reset by:
1) Any Keyboard Operation that causes a Clear Operation;
2) WCC Reset bit in EW/EWA;
3) BIND;
4) Erase/Reset SF; and
5) Subsequent Set Reply Mode.

The foregoing description of a preferred embodiment of the invention has been presented for the purpose of illustration and description. It is not intended to be exhaustive or limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

What is claimed is:

1. A method for enhancing the efficiency of data transmission in data processing system, said data processing system including a host computer running an application, wherein said application communicates with a terminal device through an optimizer, wherein said terminal device has a terminal presentation space memory and said optimizer has an optimizer presentation space memory for storing a representation of data stored in said terminal presentation space memory, said method comprising the steps of:

creating a terminal data stream in response to an operator input sequence at said terminal device, said operator input sequence modifying contents of said terminal presentation space memory;

identifying a selected combination of said operator input sequence and said terminal data stream at said terminal device that, when said terminal data stream is transmitted to said optimizer, will result in an incorrect representation in said optimizer presentation space memory of data stored in said terminal presentation space memory;

adding terminal status data to said selected terminal data stream in said terminal device to create a modified terminal data stream in response to said selected combination of said operator input sequence and said terminal data stream, wherein said modified terminal data stream includes information necessary for said optimizer to correctly represent in said optimizer presentation space memory data stored in said terminal presentation space memory;

sending said modified terminal data stream to said optimizer;

in said optimizer, recording data in said optimizer presentation space memory that represents data stored in said terminal presentation space memory in response to receiving said modified terminal data stream;

removing said terminal status data from said modified terminal data stream to recreate said selected terminal data stream; and sending said selected terminal data stream to said application, wherein said optimizer correctly maintains a record of data stored in said terminal presentation space memory.

2. The method for enhancing the efficiency of data transmission in data processing system according to claim 1 wherein said step of creating a terminal data stream in response to an operator input sequence at said terminal device includes creating a short read data stream in response to an operator entering an ERASE INPUT input sequence followed by depressing a PA1, or PA2, or PA3 key on a terminal device that uses a 3270 data stream architecture.

3. The method for enhancing the efficiency of data transmission in data processing system according to claim 1 wherein said step of identifying a selected combination of said operator input sequence and said terminal data stream at said terminal device that will result in an incorrect representation in said optimizer presentation space memory includes:

identifying an operator input sequence comprising one or more keystrokes that modify data in said terminal presentation space memory followed by an input of a PA1, PA2, or PA3 key in combination with a terminal data stream at said terminal device having only an attention identifier code.

4. The method for enhancing the efficiency of data transmission in data processing system according to claim 1 wherein said step of identifying a selected combination of said operator an input sequence and said terminal data stream at said terminal device that will result in an incorrect representation in said optimizer presentation space memory includes:

identifying an operator input sequence comprising an input of an erase input key followed by one or more keystrokes that modify data in said terminal presentation space memory in combination with a terminal data stream at said terminal device that does not indicate that said erase input key has been input.

5. The method for enhancing the efficiency of data transmission in data processing system according to claim 1 wherein said step of identifying a selected combination of said operator input sequence and said terminal data stream at said terminal device that will result in an incorrect representation in said optimizer presentation space memory includes identifying an operator input sequence comprising one or more keystrokes that enter a data string having leading or imbedded null characters in said terminal presentation space memory in combination with a terminal data stream at said terminal device that does not include said leading or imbedded null characters.

6. The method for enhancing the efficiency of data transmission in data processing system according to claim 1 wherein said step of adding terminal status data to said selected terminal data stream in said terminal device to create a modified terminal data stream includes adding data to said selected terminal data stream in said terminal device that represents said operator input sequence that modified said terminal presentation space memory in response to identifying a selected combination including:

one or more keystrokes that modify data in said terminal presentation space memory followed by an input of a PA1, PA2, or PA3 key in combination with a terminal data stream at said terminal device having only an attention identifier code.

7. The method for enhancing the efficiency of data transmission in data processing system according to claim 1 wherein said step of adding terminal status data to said selected terminal data stream in said terminal device to create a modified terminal data stream includes adding an erase input order to said selected terminal data stream in said terminal device in response to identifying a selected combination comprising:

an input of an erase input key followed by one or more keystrokes that modify data in said terminal presentation space memory in combination with a terminal data stream at said terminal device that does not indicate that said erase input key has been input.

8. The method for enhancing the efficiency of data transmission in data processing system according to claim 1 wherein said step of adding terminal status data to said selected terminal data stream in said terminal device to create a modified terminal data stream includes adding leading or imbedded null characters to said selected terminal data stream in said terminal device in response to identifying a selected combination comprising:

an operator input sequence comprising one or more keystrokes that enter a data string having leading or imbedded null characters in said terminal presentation space memory in combination with a terminal data stream at said terminal device that does not include said leading or imbedded null characters.

9. The method for enhancing the efficiency of data transmission in data processing system according to claim 1 wherein said step of recording data in said optimizer presentation space memory that represents data stored in said terminal presentation space memory includes storing data in said optimizer presentation space memory that represents changes to data stored in said terminal presentation space memory in response to data that follows an attention identifier code in said modified terminal data stream.

10. The method for enhancing the efficiency of data transmission in data processing system according to claim 1 wherein said step of recording data in said optimizer presentation space memory that represents data stored in said terminal presentation space memory includes storing, in said optimizer presentation space memory, an indication that all unprotected fields have been cleared in said terminal presentation space memory before storing data in said optimizer presentation space memory that represents changes to data stored in said terminal presentation space memory in response to data that follows an erase input order in said modified terminal data stream.

11. The method for enhancing the efficiency of data transmission in data processing system according to claim 1 wherein said step of recording data in said optimizer presentation space memory that represents data stored in said terminal presentation space memory includes recording leading or imbedded null characters in said optimizer presentation space memory in response to leading or imbedded null characters in said modified terminal data stream.

12. The method for enhancing the efficiency of data transmission in data processing system according to claim 1 wherein said step of removing said terminal status data from said modified terminal data stream includes removing data that represents changes to data in said terminal presentation space memory.

13. The method for enhancing the efficiency of data transmission in data processing system according to claim 1 wherein said step of removing said terminal status data from said modified terminal data stream includes removing an erase input order from said modified terminal data stream.

14. The method for enhancing the efficiency of data transmission in data processing system according to claim 1 wherein said step of removing said terminal status data from said modified terminal data stream includes removing leading or imbedded null characters from said modified terminal data stream.

15. A system for enhancing the efficiency of data transmission in data processing system, said data processing system including a host computer running an application, wherein said application communicates with a terminal device through an optimizer, wherein said terminal device has a terminal presentation space memory and said optimizer has an optimizer presentation space memory for storing a representation of data stored in said terminal presentation space memory, said system comprising:

means for creating a terminal data stream in response to an operator input sequence at said terminal device, wherein said operator input sequence modifies contents of said terminal device presentation space memory;

means for identifying a selected combination of said operator input sequence and said terminal data stream at said terminal device that, when said terminal data stream is transmitted to said optimizer, will result in an incorrect representation in said optimizer presentation space memory of data stored in said terminal presentation space memory;

means for adding terminal status data to said selected terminal data stream in said terminal device to create a modified terminal data stream in response to said selected combination of said operator input sequence and said terminal data stream, wherein said modified terminal data stream includes information necessary for said optimizer to correctly represent in said optimizer presentation space memory data stored in said terminal presentation space memory;

means for sending said modified terminal data stream to said optimizer;

means, in said optimizer, for recording data in said optimizer presentation space memory that represents data stored in said terminal presentation space memory in response to receiving said modified terminal data stream;

means for removing said terminal status data from said modified terminal data stream to recreate said selected terminal data stream; and means for sending said selected terminal data stream to said application, wherein said optimizer correctly maintains a record of data stored in said terminal presentation space memory.

16. The system for enhancing the efficiency of data transmission in data processing system according to claim 15 wherein said means for creating a terminal data stream in response to an operator input sequence at said terminal device includes means for creating a short read data stream in response to an operator entering an ERASE INPUT input sequence followed by depressing a PA1, or PA2, or PA3 key on a terminal device that uses a 3270 data stream architecture.

17. The system for enhancing the efficiency of data transmission in data processing system according to claim 15 wherein said means for identifying a selected combination of said operator input sequence and said terminal data stream at said terminal device that will result in an incorrect representation in said optimizer presentation space memory includes means for identifying:

an operator input sequence comprising one or more keystrokes that modify data in said terminal presentation space memory followed by an input of a PA1, PA2, or PA3 key in combination with a terminal data stream at said terminal device having only an attention identifier code.

18. The system for enhancing the efficiency of data transmission in data processing system according to claim 15 wherein said means for identifying a selected combination of said operator an input sequence and said terminal data stream at said terminal device that will result in an incorrect representation in said optimizer presentation space memory includes means for identifying:

an operator input sequence comprising an input of an erase input key followed by one or more keystrokes that modify data in said terminal presentation space memory in combination with a terminal data stream at said terminal device that does not indicate that said erase input key has been input.

19. The system for enhancing the efficiency of data transmission in data processing system according to claim 15 wherein said means for identifying a selected combination of said operator input sequence and said terminal data stream at said terminal device that will result in an incorrect representation in said optimizer presentation space memory includes means for identifying:

an operator input sequence comprising one or more keystrokes that enter a data string having leading or imbedded null characters in said terminal presentation space memory in combination with a terminal data stream at said terminal device that does not include said leading or imbedded null characters.

20. The system for enhancing the efficiency of data transmission in data processing system according to claim 15 wherein said means for adding terminal status data to said selected terminal data stream in said terminal device to create a modified terminal data stream includes means for adding data to said selected terminal data stream in said terminal device that represents said operator input sequence that modified said terminal presentation space memory in response to identifying a selected combination including:

one or more keystrokes that modify data in said terminal presentation space memory followed by an input of a PA1, PA2, or PA3 key in combination with a terminal data stream at said terminal device having only an attention identifier code.

21. The system for enhancing the efficiency of data transmission in data processing system according to claim 15 wherein said means for adding terminal status data to said selected terminal data stream in said terminal device to create a modified terminal data stream includes means for adding an erase input order to said selected terminal data stream in said terminal device in response to identifying a selected combination comprising:

an input of an erase input key followed by one or more keystrokes that modify data in said terminal presentation space memory in combination with a terminal data stream at said terminal device that does not indicate that said erase input key has been input.

22. The system for enhancing the efficiency of data transmission in data processing system according to claim 15 wherein said means for adding terminal status data to said selected terminal data stream in said terminal device to create a modified terminal data stream includes means for adding leading or imbedded null characters to said selected terminal data stream in said terminal device in response to identifying a selected combination comprising:

an operator input sequence comprising one or more keystrokes that enter a data string having leading or imbedded null characters in said terminal presentation space memory in combination with a terminal data stream at said terminal device that does not include said leading or imbedded null characters.

23. The system for enhancing the efficiency of data transmission in data processing system according to claim 15 wherein said means for recording data in said optimizer presentation space memory that represents data stored in said terminal presentation space memory includes means for storing data in said optimizer presentation space memory that represents changes to data stored in said terminal presentation space memory in response to data that follows an attention identifier code in said modified terminal data stream.

24. The system for enhancing the efficiency of data transmission in data processing system according to claim 15 wherein said means for recording data in said optimizer presentation space memory that represents data stored in said terminal presentation space memory includes means for storing, in said optimizer presentation space memory, an indication that all unprotected fields have been cleared in said terminal presentation space memory before storing data in said optimizer presentation space memory that represents changes to data stored in said terminal presentation space memory in response to data that follows an erase input order in said modified terminal data stream.

25. The system for enhancing the efficiency of data transmission in data processing system according to claim 15 wherein said means for recording data in said optimizer presentation space memory that represents data stored in said terminal presentation space memory includes means for recording leading or imbedded null characters in said optimizer presentation space memory in response to leading or imbedded null characters in said modified terminal data stream.

26. The system for enhancing the efficiency of data transmission in data processing system according to claim 15 wherein said means for removing said terminal status data from said modified terminal data stream includes means for removing data that represents changes to data in said terminal presentation space memory.

27. The system for enhancing the efficiency of data transmission in data processing system according to claim 15 wherein said means for removing said terminal status data from said modified terminal data stream includes means for removing an erase input order from said modified terminal data stream.

28. The system for enhancing the efficiency of data transmission in data processing system according to claim 15 wherein said means for removing said terminal status data from said modified terminal data stream includes means for removing leading or imbedded null characters from said modified terminal data stream.

29. A terminal device for communicating, via an optimizer, with an application running in a host computer, wherein said optimizer has an optimizer presentation space memory, said terminal device comprising:

a terminal presentation space memory that stores data;

means for creating a terminal data stream in response to an operator input sequence at said terminal device, wherein said operator input sequence modifies contents of said terminal presentation space memory;

means for identifying a selected combination of said operator input sequence and said terminal data stream at said terminal device that, when said terminal data stream is transmitted to said optimizer, will result in an incorrect representation in said optimizer presentation space memory of data stored in said terminal presentation space memory;

means for adding terminal status data to said selected terminal data stream in said terminal device to create a modified terminal data stream in response to said selected combination of said operator input sequence and said terminal data stream, wherein said modified terminal data stream includes information necessary for said optimizer to correctly represent in said optimizer presentation space memory data stored in said terminal presentation space memory; and means for sending said modified terminal data stream to said optimizer.

30. The terminal device according to claim 29 wherein said means for creating a terminal data stream in response to an operator input sequence at said terminal device includes means for creating a short read data stream in response to an operator entering an ERASE INPUT input sequence followed by depressing a PA1, or PA2, or PA3 key on a terminal device that uses a 3270 data stream architecture.

31. The terminal device according to claim 29 wherein said means for identifying a selected combination of said operator input sequence and said terminal data stream at said terminal device that will result in an incorrect representation in said optimizer presentation space memory includes means for identifying an operator input sequence comprising:

one or more keystrokes that modify data in said terminal presentation space memory followed by an input of a PA1, PA2, or PA3 key in combination with a terminal data stream at said terminal device having only an attention identifier code.

32. The terminal device according to claim 29 wherein said means for identifying a selected combination of said operator an input sequence and said terminal data stream at said terminal device that will result in an incorrect representation in said optimizer presentation space memory includes means for identifying an operator input sequence comprising:

an input of an erase input key followed by one or more keystrokes that modify data in said terminal presentation space memory in combination with a terminal data stream at said terminal device that does not indicate that said erase input key has been input.

33. The terminal device according to claim 29 wherein said means for identifying a selected combination of said operator input sequence and said terminal data stream at said terminal device that will result in an incorrect representation in said optimizer presentation space memory includes means for identifying an operator input sequence comprising:

one or more keystrokes that enter a data string having leading or imbedded null characters in said terminal presentation space memory in combination with a terminal data stream at said terminal device that does not include said leading or imbedded null characters.

34. The terminal device according to claim 29 wherein said means for adding terminal status data to said selected terminal data stream in said terminal device to create a modified terminal data stream includes means for adding data to said selected terminal data stream in said terminal device that represents said operator input sequence that modified said terminal presentation space memory in response to identifying a selected combination including:

one or more keystrokes that modify data in said terminal presentation space memory followed by an input of a PA1, PA2, or PA3 key in combination with a terminal data stream at said terminal device having only an attention identifier code.

35. The terminal device according to claim 29 wherein said means for adding terminal status data to said selected terminal data stream in said terminal device to create a modified terminal data stream includes means for adding an erase input order to said selected terminal data stream in said terminal device in response to identifying a selected combination comprising:

an input of an erase input key followed by one or more keystrokes that modify data in said terminal presentation space memory in combination with a terminal data stream at said terminal device that does not indicate that said erase input key has been input.

36. The terminal device according to claim 29 wherein said means for adding terminal status data to said selected terminal data stream in said terminal device to create a modified terminal data stream includes means for adding leading or imbedded null characters to said selected terminal data stream in said terminal device in response to identifying a selected combination comprising:

an operator input sequence comprising one or more keystrokes that enter a data string having leading or imbedded null characters in said terminal presentation space memory in combination with a terminal data stream at said terminal device that does not include said leading or imbedded null characters.

37. An optimizer for enhancing the efficiency of data transmission in a data processing system, said data processing system including a host computer running an application, wherein said application communicates with a terminal device through said optimizer, wherein said terminal device has a terminal presentation space memory and said optimizer has an optimizer presentation space memory for maintaining a record of data stored in said terminal presentation space memory, said optimizer comprising:

means, responsive to receipt of a modified terminal data stream including both terminal status data and a selected terminal data stream indicative of data in said terminal presentation space memory, for recording data in said optimizer presentation space memory that represents data stored in said terminal presentation space memory;

means for removing said terminal status data from said modified terminal data stream to obtain said selected terminal data stream, wherein said means for removing said terminal status data from said modified terminal data stream includes means for removing data that represents changes to data in said terminal presentation space memory; and means for sending said selected terminal data stream to said application, wherein said optimizer correctly maintains a record of data stored in said terminal presentation space memory.

38. The optimizer according to claim 37 wherein said means for recording data in said optimizer presentation space memory that represents data stored in said terminal presentation space memory includes means for storing data in said optimizer presentation space memory that represents changes to data stored in said terminal presentation space memory in response to data that follows an attention identifier code in said modified terminal data stream.

39. The optimizer according to claim 37 wherein said means for recording data in said optimizer presentation space memory that represents data stored in said terminal presentation space memory includes means for storing, in said optimizer presentation space memory, an indication that all unprotected fields have been cleared in said terminal presentation space memory before storing data in said optimizer presentation space memory that represents changes to data stored in said terminal presentation space memory in response to data that follows an erase input order in said modified terminal data stream.

40. The optimizer according to claim 37 wherein said means for recording data in said optimizer presentation space memory that represents data stored in said terminal presentation space memory includes means for recording leading or imbedded null characters in said optimizer presentation space memory in response to leading or imbedded null characters in said modified terminal data stream.

41. The optimizer according to claim 37 wherein said means for removing said terminal status data from said modified terminal data stream includes means for removing an erase input order from said modified terminal data stream.

42. The optimizer according to claim 37 wherein said means for removing said terminal status data from said modified terminal data stream includes means for removing leading or imbedded null characters from said modified terminal data stream.

43. The method of claim 1, wherein said creating step comprises the step of creating a terminal data stream in response to an operator input sequence at said terminal device, wherein said operator input sequence deletes data stored within said terminal presentation space memory.

44. The system of claim 15, wherein said means for creating comprises means for creating a terminal data stream in response to an operator input sequence at said terminal device, wherein said operator input sequence deletes data stored within said terminal presentation space memory.

* * * * *